Dec. 20, 1966 R. J. CUTA 3,292,349
AIR FILTER HAVING DUCTILE METAL FRAME
Original Filed Jan. 14, 1963 3 Sheets-Sheet 2
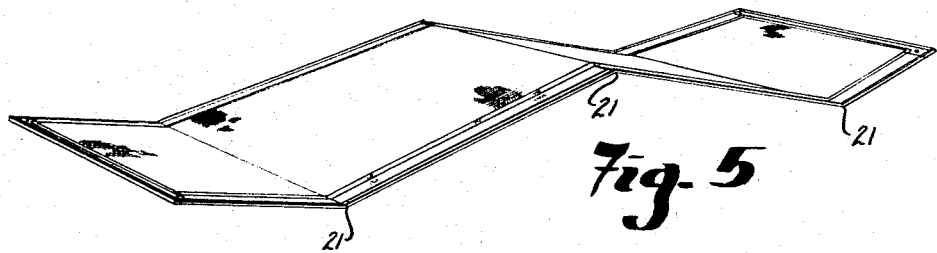
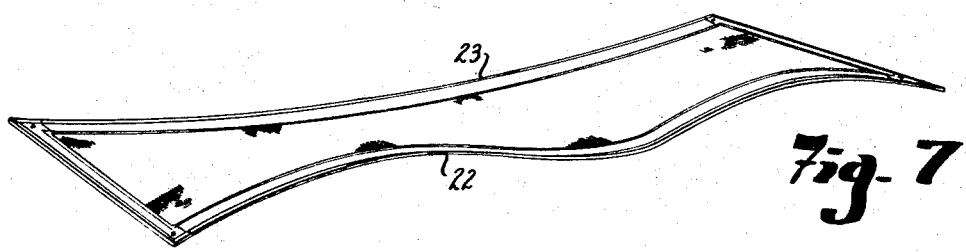
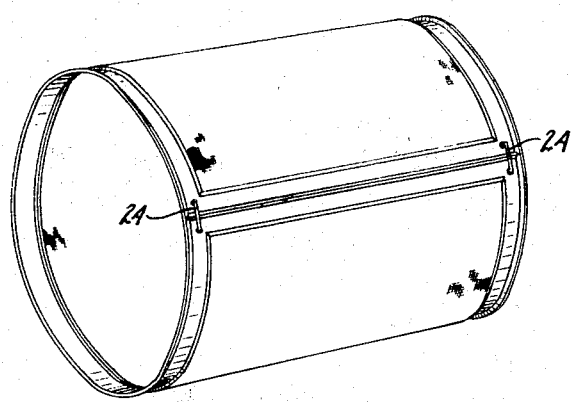
INVENTOR.
ROBERT J. CUTA
BY
Andrus & Starke
Attorneys Dec. 20, 1966   R. J. CUTA   3,292,349
AIR FILTER HAVING DUCTILE METAL FRAME
Original Filed Jan. 14, 1963   3 Sheets-Sheet 3
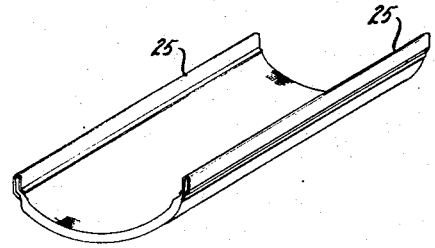
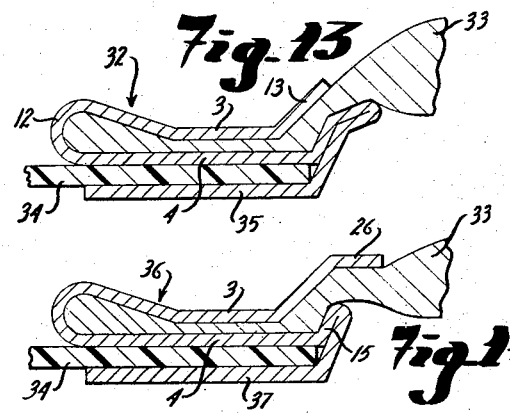
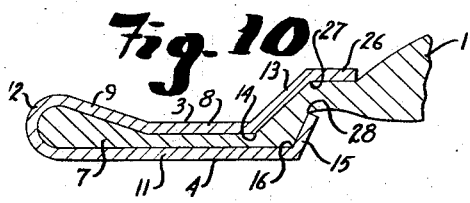
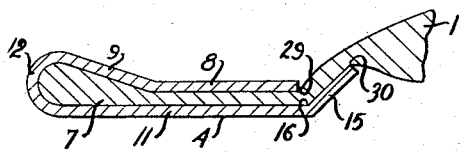
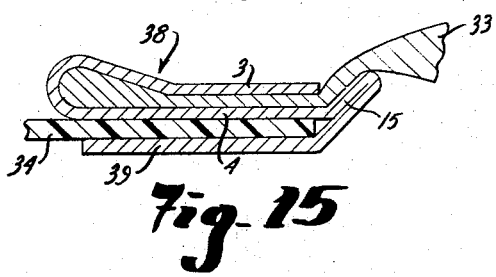
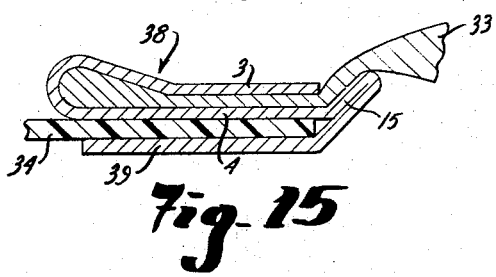
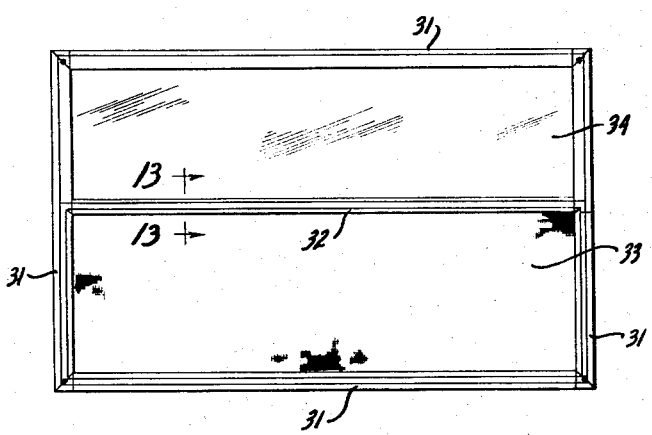
INVENTOR.
ROBERT J. CUTA
BY
Andrus & Starke
Attorneys United States Patent Office 3,292,349
Patented Dec. 20, 1966

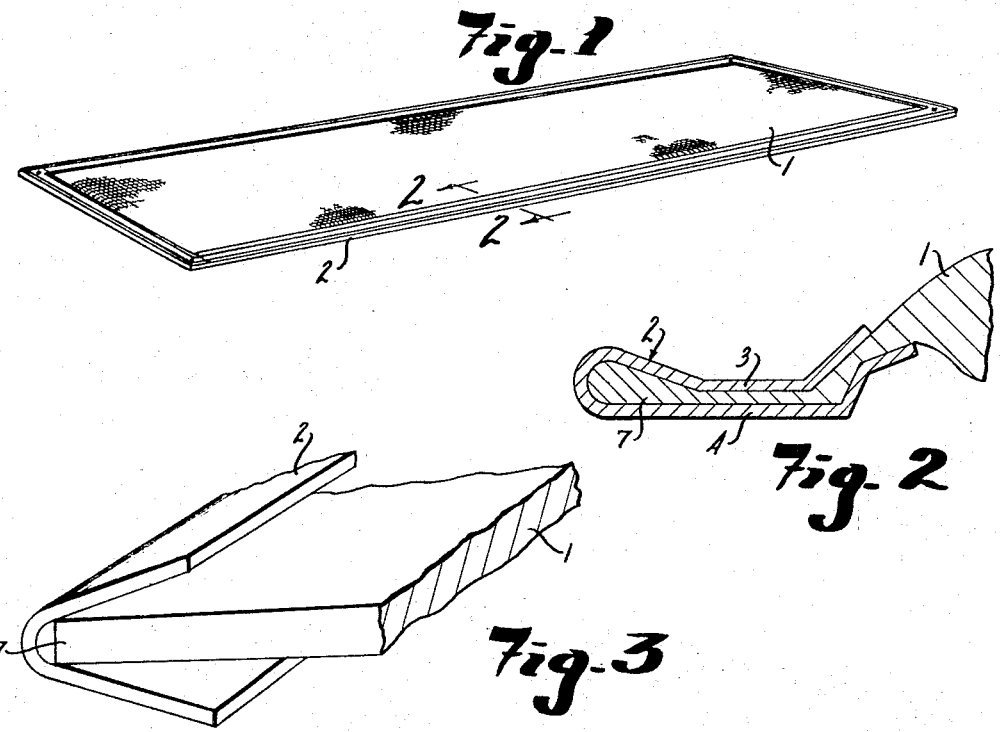
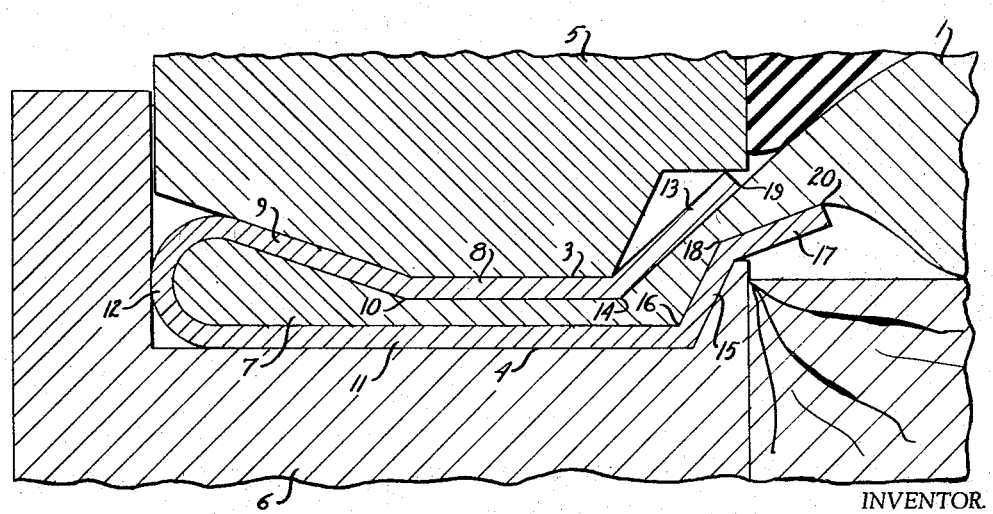

3,292,349
AIR FILTER HAVING DUCTILE METAL FRAME
Robert J. Cuta, Madison, Wis., assignor to Research Products Corporation, Madison, Wis., a corporation of Wisconsin
Continuation of application Ser. No. 251,164, Jan. 14, 1963. This application Sept. 22, 1965, Ser. No. 497,583
8 Claims. (Cl. 55—511)

This application is a continuation of application Serial No. 251,164, filed Jan. 14, 1963, and entitled Improved Filter and Frame, which became abandoned subsequent to the filing of the present application.

This invention relates to an improved filter and frame, and more particularly to a novel construction for air filters and the like wherein an improved frame construction is utilized.

In the art of manufacturing relatively rigid and/or flexible air filters commonly used in heating, ventilating, air conditioning or the like, it is often desirable to include a peripheral frame secured to the filter edge. Such frames provide, among other things, support and protection for the filter, thereby prolonging filter life and providing improved appearance. The frame also facilitates mounting of the filter securely in the air stream path so that the edges thereof are air tight.

Filter bodies of the type suitable for framing may be of the type shown in U.S. Patent No. 2,754,928. That shown is of interstitial design and has broad ingress and egress faces comprised of a plurality of superposed layers of flexible, open-mesh slit and expanded sheet material, such as aluminum foil. Reference is also made to U.S. Patent No. 2,070,073 which shows a filter body of superposed expanded sheets.

The present invention is applicable to filtering media of expanded aluminum foil and other materials such as expanded copper foil, wire or wire-like strands of reasonably malleable metal felted, knitted or otherwise formed into a filtering body. Fiber glass media, open cellular plastic foam, stacked corrugated wire mesh screens and stacked chain stitched mesh media are also suitable.

Heretofore, problems have arisen in connection with the construction of filters of the general type indicated above, wherein a supporting frame envelops the peripheral edge of the filter media. It has been found especially with elongated filters, that the frame was not always sufficiently anchored to the elongated edge of the filter media, and would on occasion substantially separate therefrom. In addition, previous attempts to form a framed filter to various contoured shapes have met with failure because the stresses involved have increased the separation and have caused unsightly and undesirable wrinkling of the frame itself, unless the metal frame is of extremely heavy gauge.

The present invention solves the aforementioned problems and provides a construction wherein a frame of comparatively light stock will not wrinkle or separate from the filter media, even when the filter is subsequently bent in the form of compound and sharp curvatures.

Generally, the invention is based on utilizing a frame which is formed to provide several areas of mechanical resistance to separation from the filter media. In the major embodiment of the invention, the edge portions of both frame legs are bent in the same direction and extend at an angle to the general plane of the filter and frame.

The accompanying drawings illustrate the best mode presently contemplated by the inventor for carrying out the invention.

In the drawings:
FIGURE 1 is a perspective view of a generally elongated filter constructed in accordance with one embodiment of the invention;
FIG. 2 is an enlarged fragmentary section of the completed filter assembly, taken on line 2—2 of FIGURE 1;
FIG. 3 is an enlarged fragmentary perspective view of a frame assembled to a filter prior to anchoring it thereto;
FIG. 4 is an enlarged view similar to FIG. 2, and illustrating the members for forming the frame to its final shape;
FIG. 5 is a perspective view of a modified form of the embodiment of the invention shown in FIGS. 1–4;
FIG. 6 is a perspective view of still another modification of the embodiment of the invention shown in FIGS. 1–4;
FIG. 7 is a perspective view of still another modification of the embodiment of the invention shown in FIGS. 1–4;
FIG. 8 is a perspective view of yet another modification of the embodiment of the invention shown in FIGS. 1–4;
FIG. 9 is a perspective view of another modification of the embodiment shown in FIGS. 1–4;
FIG. 10 is an enlarged section, similar to FIG. 2, of a second embodiment of the invention;
FIG. 11 is an enlarged section, similar to FIG. 2, of a third embodiment of the invention;
FIG. 12 is a plan view of a framed assembly having a plurality of sections and utilizing a modified form of the embodiment shown in FIG. 2;
FIG. 13 is an enlarged section taken on line 13—13 of FIG. 12;
FIG. 14 is an enlarged section similar to FIG. 10 and showing a modification thereof; and
FIG. 15 is an enlarged section similar to FIG. 11 and showing a modification thereof.

As shown in FIGS. 1 and 2 of the drawings, the invention may be embodied in an air filter comprising an elongated filter media body 1 of lightweight single or multilayer construction. The edge of body 1 is enclosed or enveloped by a generally channel-shaped ductile metal rim or frame 2 which includes an upper leg 3 and a lower leg 4 spaced therefrom.

As shown, frame 2 may comprise a plurality of separate elements with each element extending along one edge of the filter body and joined to adjacent elements at the corners in any suitable manner, such as that disclosed in the present inventor's copending patent application Ser. No. 209,679, filed July 13, 1962 and entitled Locking Method and Product Obtained Thereby, now Patent No. 3,252,213, and assigned to a common assignee. Alternatively, frame 2 may be made in a single piece and bent at the corners, such as in U.S. Patent No. 882,397 issued Mar. 17, 1908.

In accordance with the invention, and as shown in FIG. 3, the frame elements are formed from a strip of aluminum or the like and are initially bent over to provide open legs. These frame elements are placed loosely over the generally planular edges of the filter body. In many instances, as when the filter body is of substantial thickness, such as ½" to 2", it is necessary to pre-compact the filter edge so that it properly fits within the legs of the frame. This pre-compaction may be accomplished in any suitable manner, such as is shown in FIG. 3 of the drawings of copending John A. Liebmann application Ser. No. 81,842, filed Jan. 10, 1961, entitled Method of Framing a Filter and Product Obtained thereby and assigned to a common assignee which was copending with original application Ser. No. 251,164 referred to above, and which is now abandoned.

In the case of plastic foam filter media, thickness reduction can be accomplished by hot pressing at the margins, or treating them with a thermoplastic or resinous hot setting composition to hold the margins in a compressed form while they are inserted into the frame.

The entire assembly is then placed in a suitable forming mechanism which includes (FIG. 4) an upper male die 5 and a lower female die 6 which are contoured to produce the final frame shape. Actuation of the forming apparatus serves to form the legs 3 and 4. When the filter body edge has not been precompacted, forming as in FIG. 4 also compacts the edge 7 of body 1 so that it is substantially thinner than the remaining central body portion.

As best shown in FIGS. 2 and 4, frame 2 has a hairpin-like cross section and the legs serve to confine filter edge 7 therebetween. For this purpose, each leg is provided with outer and inner edge areas joined by a central body segment.

As best shown in FIG. 4, the central body segment of upper leg 3 comprises a generally flat inner portion 8 which merges outwardly into an outer portion 9 which is upwardly inclined at an acute angle to portion 8. The point of merger between portion 8 and converging portion 9 provides a slight inner ridge or shoulder 10 which provides an abrupt change in direction of leg extent for purposes to be described. Flat portion 8 is disposed parallel to the general plane of a flat frame or to the axis of curvature of the respective portion of a contoured frame.

The central body segment of lower leg 4 comprises a generally flat portion 11 which is disposed parallel to flat portion 8 and which extends beneath both portions 8 and 9 and to slightly inwardly of the former.

Leg portions 9 and 11 merge outwardly into the outer edge area of the frame which joins them and which comprises a generally arcuate fold 12 having a radius of curvature about equal to the distance between flat portions 8 and 11.

Further in accordance with the major embodiment of the invention, leg portions 8 and 11 merge inwardly into the inner edge areas of the frame. For this purpose, leg 8 merges into a flange 13 which is upwardly inclined at a substantial angle thereto, such as about 45°. The juncture of leg portion 8 and flange 13 produces an inner ridge or shoulder 14. In addition, flat portion 11 merges into a flange 15 which is upwardly inclined at a greater angle than flange 13 so that it converges with the latter. The juncture between portion 11 and flange 15 provides an inner valley 16 which provides an abrupt change in leg extent. Flange 15 is provided with a lip 17 which is inclined at an angle less than flange 13, so that it gradually diverges from the latter. The juncture between flange 15 and lip 17 provides an inner ridge or shoulder 18. Filter edge 7 is tightly confined between all the elements of the frame and substantially fills the space therebetween. The outer extremity of edge 7 is gradually reduced in thickness toward the confined area between flat portions 8 and 11. The edge is of constant thickness in this confined area inwardly of shoulder 10 but increases in thickness for a short distance between shoulder 14 and valley 16. Up to this point, filter edge 7 is disposed generally parallel to the filter.

In this area between shoulder 14 and valley 16, the frame forces the filter edge sharply upwardly, where it again decreases in thickness until shoulder 18 is encountered; whereupon the filter enlarges as it passes by the edge corners 19 and 20 of flange 13 and lip 17 respectively and hence merges into the filter body proper.

Thus, filter edge 7 is so formed by frame 2 that it alternately changes thickness, starting from the outer extremity: from decreasing to constant to increasing to decreasing, and finally to increasing section. In addition the general direction of edge extent is substantially changed within the frame inwardly of the portion of constant thickness, i.e., at shoulder 14.

Shoulders 10, 14 and 18 which are disposed at three points wherein the thickness alternates, provide substantial mechanical resistance to lateral separation of the frame and filter. Any component of lateral force tending to cause separation will be strongly resisted, since the edge 7 will have to pull past the shoulders.

In addition, since flanges 13 and 15 and lip 17 all extend in the same general direction from the frame legs and at an angle thereto, separation is retarded by the abrupt change in general extent of the central filter body at point 14 and at corner 20. The filter must also pass over the corner 20 which thereby provides further resistance.

While the filter shown in FIG. 1 is flat, the invention can be adapted with advantage to many different configurations.

In FIG. 5, the elongated filter is shown as having three sharp laterally extending parallel bends 21. The inventor has found that the frame tenaciously holds the width of the filter within the accepted manufacturing tolerances and does not wrinkle appreciably even though bent sharply at 90° or more. Other known frames would tend to spread and let the filter media slip out. This filter is adaptable for ventilation of electronic devices such as computers and the like. It may also be used in modernistic air conditioners and in cramped quarters.

FIG. 6 shows a construction wherein the filter has a double curvature with all of the curve elements parallel. Here, again, no separation occurs. The ductility of this relatively light gauge metal frame permits this compound curvature.

FIG. 7 shows a construction wherein one elongated edge 22 has a sharper curvature than the opposite edge 23. Edge 23 can even be straight and the frame will still cling to the filter.

In FIG. 8, the filter has been formed into a cylinder with the ends secured together as by staples 24. Such a filter illustrates the remarkable facility with which the frame may be curved without distortion. The filter may be used for air supply of internal combustion engines.

In some instances, it is desirable to utilize a filter wherein the frame does not extend around the entire periphery of the filter, but rather only along one or several sides. FIG. 9 shows an elongated filter having the frame elements 25 of the invention extending only along the long edges, with no frame along the short ends. Such a filter may have a curved transverse section, as shown, and is useful in computing machines or in other suitable applications.

FIG. 10 shows an embodiment slightly different than the major embodiments of FIGS. 1–9. This frame element may, as with the other embodiments, be adapted to circular filters and includes an extension 26 of the top leg which extends horizontally inwardly from flange 13, thereby forming a further valley 27 therebetween. In addition, lip 17 is eliminated, leaving a corner 28 on the end of extension 26 which provides resistance similar to corner 20 of FIG. 4.

A further embodiment is shown in FIG. 11 wherein the frame of FIGS. 1–9 is modified by eliminating flange 13 and lip 17. In this instance, flat portion 8 terminates in an edge 29 and flange 15 terminates in an edge 30 above edge 29. The annular flange 15 combined with the horizontal portion 8 provides a resistance to separation, since the filter media must pull upwardly at edge 29 and then over edge 30. The filter media may increase in thickness inwardly of the latter edge.

FIGS. 12–15 show structures wherein the various embodiments of the invention may be utilized in a sectionalized filter having filter media in one section and another material, such as translucent plastic, in the other section. Such assemblies have found uses in certain air conditioning applications utilizing a combined framed filter and window.

As shown generally in FIG. 12, the assembly comprises a peripheral frame 31 which may be at least partially of the type of the present invention. A cross-brace 32 joins opposite edges of the frame and joins a suitable filter media body 33 in the lower section and a clear planular window 34 in the upper section.

As shown in FIG. 13, cross brace 32 is similar to the frame of FIGS. 1–9 for securing body 33. However, in addition, lower leg 4 becomes intermediate and is folded back upon itself at its inner end and is extended outwardly to form a third leg 35 which is generally coextensive with and spaced beneath leg 4. This space is adapted to receive window 34, which extends outwardly of cross-brace 32.

FIG. 14 shows a cross-brace 36 similar to the frame shown in FIG. 10. Here again, the lower leg is folded back upon itself to form a third leg 37 spaced to receive the window 34.

Finally, FIG. 15 shows a cross-brace 38 similar to the frame shown in FIG. 11. The lower leg is also folded back upon itself to form the third leg 39 spaced to receive window 34.

The invention provides an outstanding improvement in the art of framed filters. By laterally alternating the thickness of the frame between spaced frame portions, and by radically altering the direction of lateral extent of the filter edge, the final product will not pull apart or separate. Nor will it distort upon bending.

The filter media is gripped by the frame behind one or more pockets filled with the media. The outer pocket is formed in a loop area which enables a limited amount of flexing or curving of the frame.

Various modes of carrying out the invention are contemplated as being within the scope of the following claims particularly pointing out and distinctly claiming the subject matter which is regarded as the invention.

I claim:

1. A framed filter comprising, a filter media body of crushable material of substantial thickness and having a peripheral edge portion, and a ductile channel-like metal frame enveloping and compacting at least part of said edge portion therebetween and comprising an upper leg spaced from a lower leg and with said legs joined along the outer edges thereof by an arcuate fold, said upper leg converging toward said lower leg inwardly from said arcuate fold and forming a first shoulder at the inner end of the convergence and providing an enlarged pocket in the region of said arcuate fold, both said legs extending in parallel relationship inwardly of said first shoulder and with said upper leg providing a second shoulder disposed inwardly of the first shoulder, said legs converging at a substantial angle to and inwardly of the parallel portions thereof, and with said lower leg providing a third shoulder at the inner end of such last-named convergence, said legs diverging inwardly from said third shoulder and with said lower leg terminating at an edge over which said filter media body is disposed, the edge portion of said media being confined in said frame and substantially filling the space between said legs and in said fold, and the structure providing mechanical resistance to lateral separation of the frame from said body.

2. The framed filter of claim 1 in which said lower leg along at least one side of the frame is folded back upon itself at its inner end to provide a third leg generally coextensive with and spaced from said lower leg, and a sheet of material disposed in the space between said lower leg and said third leg and extending outwardly away from said filter media body.

3. A framed filter comprising, a filter media body of crushable material of substantial thickness and having a peripheral edge portion, and a ductile channel-like metal frame enveloping and compacting at least part of said edge portion therebetween and comprising an upper leg spaced from a lower leg and with said legs joined along the outer edges thereof by an arcuate fold, said upper leg converging toward said lower leg inwardly from said arcuate fold and forming a first shoulder at the inner end of the convergence and providing an enlarged pocket in the region of said arcuate fold, both said legs extending in parallel relationship inwardly of said first shoulder and with said upper leg providing a second shoulder disposed inwardly of the first shoulder, said legs converging at a substantial angle to and inwardly of the parallel portions thereof, and with said lower leg terminating at the inner end of said last-named convergence at an edge over which said filter media body is disposed, said upper leg providing a horizontal edge portion extending inwardly from the inner end of said last-named convergence, the edge portion of said media being confined in said frame and substantially filling the space between said legs and in said fold, and the structure providing mechanical resistance to lateral separation of the frame from said body.

4. The framed filter of claim 3 in which said lower leg along at least one side of the frame is folded back upon itself at its inner end to provide a third leg generally coextensive with and spaced from said lower leg, and a sheet of material disposed in the space between said lower leg and said third leg and extending outwardly away from said filter media body.

5. A framed filter comprising, a filter media body of crushable material of substantial thickness and having a peripheral edge portion, and a ductile channel-like metal frame enveloping and compacting at least part of said edge portion therebetween and comprising an upper leg spaced from a lower leg and with said legs joined along the outer edges thereof by an arcuate fold, said upper leg converging toward said lower leg inwardly from said arcuate fold and forming a shoulder at the inner end of the convergence and providing an enlarged pocket in the region of said arcuate fold, both said legs extending in parallel relationship inwardly of said shoulder and with said upper leg terminating at a first edge inwardly of the said shoulder, the inner portion of said lower leg extending upwardly at an angle from the parallel portion thereof and terminating at a second edge disposed above said first edge and over which said filter media body is disposed, the edge portion of said media being confined in said frame and substantially filling the space between said legs and in said fold, and the structure providing mechanical resistance to lateral separation of the frame from said body.

6. The framed filter of claim 5 in which said lower leg along at least one side of the frame is folded back upon itself at its inner end to provide a third leg generally coextensive with and spaced from said lower leg, and a sheet of material disposed in the space between said lower leg and said third leg and extending outwardly away from said filter media body.

7. A framed air filter adapted to be bent into any one of a plurality of shapes, said filter having a generally planar filter media of crushable material of substantial thickness providing peripheral edge portions and a ductile metal frame facilitating flexing with a minimum of distortion and enveloping and compacting said edge portions, said frame comprising side members having an upper leg and a lower leg closely confining and gripping the corresponding edge portions of said filter media, and an outwardly curved loop joining said legs at the outer marginal edge of the frame with said legs converging inwardly of said loop to additionally crush the filter media inwardly of said loop to a thickness substantially less than its original thickness and substantially less than the thickness of the filter media in said loop, said legs forming an enlarged pocket substantially filled with the edge portions of said filter media to prevent separation of the same from the frame upon bending of the filter.

8. The construction of claim 7 in which said legs have their inner edges formed angularly of the general plane of the filter and are related to each other angularly to provide at least one additional pocket for filter media extending generally parallel to the frame members and providing areas of compacted filter media of different thicknesses an thereby tending to additionally prevent separation of the filter media from the frame upon bending.

References Cited by the Examiner
UNITED STATES PATENTS

| | | | |
|---|---|---|---|
| 178,103 | 5/1876 | Bracher | 55—521 X |
| 882,397 | 3/1908 | Limoge | 160—402 X |
| 1,775,717 | 9/1930 | Everhard | 160—371 X |
| 1,793,535 | 2/1931 | Abronski | 160—399 X |
| 1,801,949 | 4/1931 | Broudy et al. | 55—504 X |
| 2,008,800 | 7/1935 | Somers | 55—491 X |
| 2,209,741 | 7/1940 | Sullivan et al. | 210—499 X |
| 2,966,206 | 12/1960 | Hartman. | |

ROBERT F. BURNETT, *Primary Examiner.*